(12) United States Patent
Benesty et al.

(10) Patent No.: US 6,826,284 B1
(45) Date of Patent: Nov. 30, 2004

(54) METHOD AND APPARATUS FOR PASSIVE ACOUSTIC SOURCE LOCALIZATION FOR VIDEO CAMERA STEERING APPLICATIONS

(75) Inventors: Jacob Benesty, Summit, NJ (US); Gary Wayne Elko, Summit, NJ (US); Yiteng Huang, Atlanta, GA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/498,561

(22) Filed: Feb. 4, 2000

(51) Int. Cl.⁷ .................................. H04R 3/00
(52) U.S. Cl. ..................... 381/92; 348/14.08
(58) Field of Search .............. 381/92, 91, 71.12, 381/71.11, 94.7, 94.8, 94, 122, 56; 348/14.08, 14.01, 14.15, 17, 18, 19

(56) References Cited

U.S. PATENT DOCUMENTS

| | | | | |
|---|---|---|---|---|
| 5,095,467 A | * | 3/1992 | Olson et al. .................. | 367/125 |
| 5,633,935 A | * | 5/1997 | Kanamori et al. ............. | 381/26 |
| 5,737,431 A | * | 4/1998 | Brandstein et al. ............ | 381/92 |
| 6,097,763 A | * | 8/2000 | Djokovic et al. ............ | 375/260 |
| 6,157,403 A | * | 12/2000 | Nagata ........................ | 348/171 |
| 6,469,732 B1 | * | 10/2002 | Chang et al. ............. | 348/14.08 |
| 6,487,295 B1 | * | 11/2002 | Lofgren et al. ........... | 381/71.12 |

* cited by examiner

Primary Examiner—Duc Nguyen
Assistant Examiner—Lun-See Lao

(74) Attorney, Agent, or Firm—Richard J. Botos; Kenneth M. Brown

(57) ABSTRACT

A real-time passive acoustic source localization system for video camera steering advantageously determines the relative delay between the direct paths of two estimated channel impulse responses. The illustrative system employs an approach referred to herein as the "adaptive eigenvalue decomposition algorithm" (AEDA) to make such a determination, and then advantageously employs a "one-step least-squares algorithm" (OSLS) for purposes of acoustic source localization, providing the desired features of robustness, portability, and accuracy in a reverberant environment. The AEDA technique directly estimates the (direct path) impulse response from the sound source to each of a pair of microphones, and then uses these estimated impulse responses to determine the time delay of arrival (TDOA) between the two microphones by measuring the distance between the first peaks thereof (i.e., the first significant taps of the corresponding transfer functions). In one embodiment, the system minimizes an error function (i.e., a difference) which is computed with the use of two adaptive filters, each such filter being applied to a corresponding one of the two signals received from the given pair of microphones. The filtered signals are then subtracted from one another to produce the error signal, which is minimized by a conventional adaptive filtering algorithm such as, for example, an LMS (Least Mean Squared) technique. Then, the TDOA is estimated by measuring the "distance" (i.e., the time) between the first significant taps of the two resultant adaptive filter transfer functions.

27 Claims, 5 Drawing Sheets

METHOD AND APPARATUS FOR PASSIVE ACOUSTIC SOURCE LOCALIZATION FOR VIDEO CAMERA STEERING APPLICATIONS

FIELD OF THE INVENTION

The present invention relates generally to the field of acoustics and more particularly to the problem of localizing an acoustic source for purposes of, for example, tracking the source with a video camera.

BACKGROUND OF THE INVENTION

In current video-conferencing environments, a set of cameras are typically set up at a plurality of different locations to provide video of the active talker as he or she contributes to the discussion. In previous teleconferencing environments, this tedious task needed the full involvement of professional camera operators. More recently, however, artificial object tracking techniques have been advantageously used to locate and track an active talker automatically in three dimensional space—namely, to determine his or her range and azimuth, as well as his or her elevation. In this manner, the need for one or more human camera operators can be advantageously eliminated.

There are several possible approaches for automatically tracking an active talker. Broadly they can be divided into two classes—the class of visual tracking and the class of acoustic tracking—depending on what particular type of information (visual or acoustic cues, respectively) is employed. Even though visual tracking techniques have been investigated for several decades and have had reasonably good success, acoustic source localization systems have certain advantages that are not present in vision-based tracking systems. For example, acoustic approaches which receive an acoustic signal omnidirectionally can advantageously act in the dark. Therefore they are able to detect and locate sound sources in the rear or which are otherwise "in hiding" from the view of the camera.

Humans, like most vertebrates, have two ears which form a microphone array, mounted on a mobile base (i.e., a human head). By continuously receiving and processing the propagating acoustic signals with such a binaural auditory system, we accurately and instantaneously gather information about the environment, particularly about the spatial positions and trajectories of sound sources and about their states of activity. However, the brilliant performance features demonstrated by our binaural auditory system form a big technical challenge for acoustic engineers attempting to artificially recreate the same effect, primarily as a result of room reverberation. Nonetheless, microphone array processing is a rapidly emerging technique which can play an important role in a practical solution to the active talker tracking problem.

In general, locating point sources using measurements or estimates from passive, stationary sensor arrays has had numerous applications in navigation, aerospace, and geophysics. Algorithms for radiative source localization, for example, have been studied for nearly 100 years, particularly for radar and underwater sonar systems. Many processing techniques have been proposed, with differing levels of complexity and differing restrictions. The application of such source localization concepts to the automation of video camera steering in teleconferencing applications, however, has been only recently addressed.

Specifically, existing acoustically-based source localization methods can be loosely divided into three categories—steered beamformer-based techniques, high-resolution spectral estimation-based techniques, and time delay estimation-based techniques. (See, e.g., "A Practical Methodology for Speech Source Localization with Microphone Arrays" by M. S. Brandstein et al., Comput., Speech, Language, vol. 2, pp. 91–126, November 1997.) With continued investigation over the last two decades, the time delay estimation-based location method has become the technique of choice, especially in recent digital systems. In particular, research efforts that have been applied to time delay estimation-based source localization techniques primarily focus on obtaining improved (in the sense of accuracy, robustness, and efficiency) source location estimators which can be implemented in real-time with a digital computer.

More specifically, time delay estimation-based localization systems determine the location of acoustic sources based on a plurality of microphones in a two-step process. In the first step, a set of time delay of arrivals (TDOAs) among different microphone pairs is calculated. That is, for each of a set of microphone pairs, the relative time delay between the arrival of the acoustic source signal at each of the microphones in the pair is determined. In the second step, this set of TDOA information is then employed to estimate the acoustic source location with the knowledge of the particular microphone array geometry. Methods which have been employed to perform such localization (i.e., the second step of the two step process) include, for example, the maximum likelihood method, the triangulation method, the spherical intersection method, and the spherical interpolation method. (See the discussion of these techniques below.)

Specifically, time delay estimation (TDE) (i.e., the first step of the two step process) is concerned with the computation of the relative time delay of arrival between different microphone sensors. In developing a time delay estimation algorithm (i.e., the first of the two steps of a time delay estimation-based acoustic source localization system), it is necessary to make use of an appropriate parametric model for the acoustic environment. Two parametric acoustic models for TDE problems—namely, ideal free-field and real reverberant models—may be employed.

Generally then, the task of a time delay estimation algorithm is to estimate the model parameters (more specifically, the TDOAs) based on the model employed, which typically involves determining parameter values that provide minimum errors in accordance with the received microphone signals. In particular, conventional prior art time delay estimation-based acoustic source localization systems typically use a generalized cross-correlation (GCC) method that selects as its estimate the time delay which maximizes the cross-correlation function between time-shifted versions of the signals of the two distinct microphones. (See, e.g., "The Generalized Correlation Method for Estimation of Time Delay" by C. H. Knapp et al., IEEE Trans. Acoust., Speech, Signal Processing, vol. ASSP-24, pp. 320–327, August 1976.)

More specifically, in the GCC approach, the TDOA between two microphone sensors can be found by computing the cross-correlation function of their signals and selecting the peak location. The peak can be sharpened by pre-whitening the signals before computing the cross-correlation, which leads to the so-called phase transform method. Techniques have been proposed to improve the generalized cross-correlation (GCC) algorithms in the presence of noise. (See, e.g., "A Pitch-Based Approach to Time-Delay Estimation of Reverberant Speech" by M. S. Brandstein, Proc. IEEE ASSP Workshop Appls. Signal Processing Audio Acoustics, 1997). But because GCC is based on a simple signal propagation model in which the signals acquired by each microphone are regarded as delayed replicas of the source signal plus background noise, it has a fundamental drawback of an inability to cope well with the reverberation effect. (See, e.g., "Performance of Time-Delay Estimation in the Presence of Room Reverberation" by B. Champagne et al., IEEE Trans. Speech Audio Processing, vol. 4, pp. 148–152, March 1996.) Although some improvement may be gained by cepstral prefiltering, shortcomings still remain. (See, e.g., "Cepstral Prefiltering for Time Delay Estimation in Reverberant Environments" by A. Stephenne et al., Proc. IEEE ICASSP, 1995, pp. 3055–58.) Even though more sophisticated techniques exist, they tend to be computationally intensive and are thus not well suited for real-time applications. (See, e.g., "Modeling Human Sound-Source Localization and the Cocktail-Party-Effect," by M. Bodden, Acta Acoustica 1, pp. 43–55, 1993.) Therefore, an alternative approach to the GCC method for use in reverberant environments would be highly desirable.

SUMMARY OF THE INVENTION

In accordance with an illustrative embodiment of the present invention, a real-time passive acoustic source localization system for video camera steering advantageously determines the relative delay between the direct paths of two estimated channel impulse responses. The illustrative system employs a novel approach referred to herein as the "adaptive eigenvalue decomposition algorithm" (AEDA) to make such a determination, and then advantageously employs a "one-step least-squares" algorithm (OSLS) for purposes of acoustic source localization. The illustrative system advantageously provides the desired features of robustness, portability, and accuracy in a reverberant environment.

More specifically, and in accordance with one aspect of an illustrative embodiment of the present invention, the AEDA technique directly estimates the (direct path) impulse response from the sound source to each of the microphones in a pair of microphones, and then uses these estimated impulse responses to determine the TDOA associated with the given pair of microphones, by determining the distance between the first peaks thereof (i.e., the first significant taps of the corresponding transfer function).

For example, in accordance with one illustrative embodiment of the present invention, a passive acoustic source localization system minimizes an error function (i.e., a difference) which is computed with the use of two adaptive filters, each such filter being applied to a corresponding one of the two signals received from the pair of microphones for which it is desired to compute a TDOA. The filtered signals are advantageously subtracted from one another to produce the error signal, which signal is minimized by a conventional adaptive filtering algorithm such as, for example, an LMS (Least-Mean-Squared) technique, such as may be used, for example, in acoustic echo cancellation systems and which is fully familiar to those of ordinary skill in the art. Then, the TDOA may be estimated by determining the "distance" (i.e., the time) between the first significant taps of the two resultant adaptive filter transfer functions.

In accordance with another aspect of an illustrative embodiment of the present invention, the acoustic source location is subsequently performed (based on the resultant TDOAs) with use of an OSLS algorithm, which advantageously reduces the computational complexity but achieves the same results as a conventional spherical interpolation (SI) method. And in accordance with still another aspect of the present invention, the filter coefficients may be advantageously updated in the frequency domain using the unconstrained frequency-domain LMS algorithm, so as to take advantage of the computational efficiencies of a Fast Fourier Transform (FFT).

BRIEF DESCRIPTION OF THE DRAWINGS

FIG. 1 shows schematic diagrams of acoustic models which may be used for time delay estimation problems.

DETAILED DESCRIPTION

Illustrative Acoustic Models for use in Solving the TDE Problem

Figure 1A:
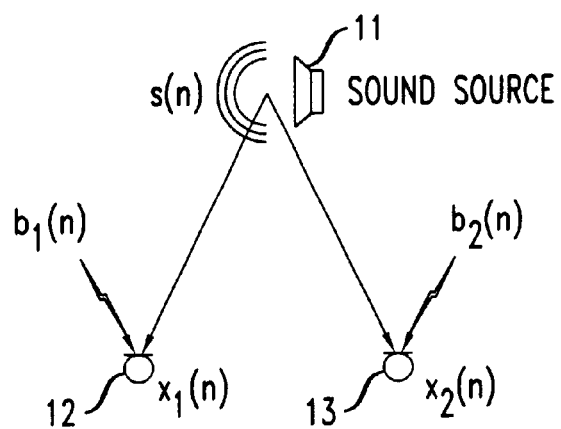
FIG. 1A shows a diagram of an ideal free-field acoustic model.

FIG. 1A shows a diagram of an ideal free-field acoustic model which may be used for time delay estimation problems. Sound is generated by sound source 11 and received by each of two microphones—microphone 12 and microphone 13—whose (relative) TDOA is to be determined. In such an anechoic space (as illustrated in FIG. 1A), the given source signal s(n) propagates radiatively and the signal acquired by the i-th (i=1, 2) microphone can be expressed as follows:

$$x_i(n)=\alpha_i s(n-\tau_i)+b_i(n), \quad (1)$$

where $\alpha_i$ is an attenuation factor due to propagation loss and spreading, $\tau_i$ is the propagation time, and $b_i(n)$ is the additive noise. The relative delay between the two microphone signals is defined as $$\tau_{12}=\tau_1-\tau_2 \quad (2)$$

Assume that s(n), $b_1(n)$, and $b_2(n)$ are zero-mean, uncorrelated, stationary Gaussian random processes. In this case, the ideal free-field model generates a mathematically clear solution for $\tau_{12}$ that is widely used for the classical TDE problem.

Figure 1B:
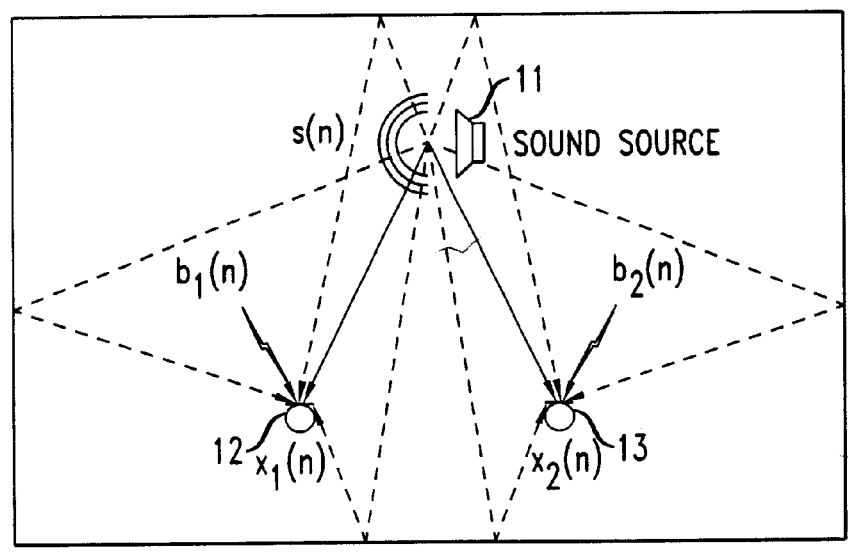
FIG. 1B shows a diagram of a real reverberant acoustic model.

In a real acoustic environment, however, one must take into account the reverberation of the room and the above ideal model as illustratively shown in FIG. 1A no longer holds. FIG. 1B shows a diagram of a real reverberant acoustic model which may be used more advantageously for time delay estimation problems in accordance with an illustrative embodiment of the present invention. In particular, a more complicated but more realistic model for the microphone signals $x_i(n)$, i=1,2 can be expressed as follows:

$$x_i(n)=g_i*s(n)+b_i(n), \quad (3)$$

where * denotes convolution and $g_i$ is the acoustic impulse response of the channel between the source and the i-th microphone. Moreover, $b_1(n)$ and $b_2(n)$ might be correlated, which is the case when the noise is directional, such as, for example, noise from a ceiling fan or an overhead projector. In this case, we do not have an "ideal" solution to the problem, as for the previous model, unless we can accurately (and effectively blindly) determine the two impulse responses.

Prior Art GCC Approach to the TDE Problem

In the GCC technique which is based on the simple signal propagation model, the time-delay estimate is obtained as the value of $\tau$ that maximizes the generalized cross-correlation function given by $$\psi_{y_1 y_2}(\tau) = \int_{-\infty}^{-\infty} \Phi(f) S_{y_1 y_2}(f) e^{j2\pi f \tau} df \qquad (4)$$

$$= \int_{-\infty}^{+\infty} \Psi_{x_1 x_2}(f) e^{j2\pi f \tau} df.$$

where $S_{x_1 x_2}(f) = E\{X_1(f) X^{\ddagger}_2(f)\}$ is the cross-spectrum, $\Phi(f)$ is a weighing function and $$\Psi_{x_1 x_2}(f) = \Phi(f) S_{x_1 x_2}(f) \qquad (5)$$

is the generalized cross-spectrum. Then, the GCC TDE may be expressed as:

$$\hat{\tau}_\varphi = \underset{\tau}{\mathrm{argmax}} \; \psi_{x_1 x_2}(\tau). \qquad (6)$$

The choice of $\Phi(f)$ is important in practice. The classic cross-correlation (CCC) method is obtained by taking $\Phi(f) = 1$. In the noiseless case, with the model of Equation (1), knowing that $X_i(f) = \alpha_i e^{-j2\pi \tau_i} S(f)$, i=1,2, we have:

$$\psi_{x_1 x_2}(f) = \psi_{cc}(f) = E\{X_1(f) X_2^*(f)\} = \alpha_1 \alpha_2 e^{-j2\pi \tau_{12}} E\{|S(f)|^2\}. \qquad (7)$$

The fact that $\psi_{cc}(f)$ depends on the source signal can clearly be problematic for TDE.

It is clear by examining Equation (6) that the phase rather than the magnitude of cross-spectrum provides the TDOA information. Thereafter, the cross-correlation peak can be sharpened by pre-whitening the input signals, i.e., by choosing $\phi(f) = 1/|S_{x_1 x_2}(f)|$, which leads to the so-called phase transform (PHAT) method. (See, e.g., "The Generalized Correlation Method for Estimation of Time Delay" by C. H. Knapp et al., IEEE Trans. Acoust., Speech, Signal Processing, vol. ASSP-24, pp. 320–327, August 1976; and "Acoustic Source Location in Noisy and Reverberant Environment using CSP Analysis" by M. Omologo et al., Proc. IEEE ICASSP, 1996, pp. 921–924.) Also in the absence of noise, the cross spectrum, $$\psi_{x_1 x_2}(f) = \psi_{pi}(f) = e^{-j2\pi / \tau_{12}} \qquad (8)$$

depends only on the $\tau_{12}$ and thus can, in general, achieve better performance than CCC, especially when the input signal-to-noise ration (SNR) is low. Although GCC is simple and easy to implement, it will fail when the reverberation becomes important because the fundamental model assumptions are violated.

A Novel Illustrative Solution to the TDE Problem—the AEDA Method

In accordance with an illustrative embodiment of the present invention, a completely different approach from the prior art GCC technique is employed. This novel method focuses directly on the channel impulse responses for TDE. Specifically, an adaptive eigenvalue decomposition algorithm (AEDA) is advantageously used for TDE. The AEDA focuses directly on the channel impulse for TDE and assumes that the system (i.e., the room) is linear and time invariant. By following the real reverberant model as illustrated in FIG. 1B, and by observing the fact that $$x_1 * g_2 = s * g_1 g_2 = x_2 g_1 \qquad (9)$$

in the noiseless case, one can deduce the following relation at time n:

$$x^T(n) u = x_1^T(n) g_2 - x_2^T(n) g_1 = 0 \qquad (10)$$

where $x_i$ is the signal picked up by the i-th (i=1, 2) microphone, $^T$ denotes transpose, $$x_i(n) = [x_i(n), x_i(n-1), \ldots, x_i(n-M+1)]^T, \qquad (11)$$

$$g_i = [g_{i,0}, g_{i,1}, \ldots, g_{i,M-1}]^T, \; i=1,2 \qquad (12)$$

$$x(n) = [x_1^T(n), x_2^T(n)]^T, \qquad (13)$$

$$u = [g_2^T, -g_1^T]^T, \qquad (14)$$

and M is the length of the impulse responses. (See, e.g., "Adaptive Filtering Algorithms for Stereophonic Acoustic Echo Cancellation" by J. Benesty et al., Proc. IEEE ICASSP, pp. 3099–3102, 1995.)

From Equation (10), it can be derived that $R(n)u=0$, where $R(n) = E\{x(n) x^T(n)\}$ is the covariance matrix of the microphone signals $x(n)$. This implies that the vector u (containing the two impulse responses) is the eigenvector of the covariance matrix $R(n)$ corresponding to the eigenvalue equal to 0. Moreover if the two impulse responses $g_1$ and $g_2$ have no common zeros and the autocorrelation matrix of the source signal s(n) is full rank, which is advantageously assumed herein, the covariance matrix $R(n)$ has one and only one eigenvalue equal to 0.

In practice, accurate estimation of the vector u is not trivial due to the nonstationary nature of speech, the length of the impulse responses, the background noise, etc. However, for the present application we only need to find an efficient way to detect the direct paths of the two impulse responses.

In order to efficiently estimate the eigenvector (here û) corresponding to the minimum eigenvalue of R(n), the constrained LMS algorithm, familiar to those of ordinary skill in the art, may be used. (See, e.g., "An Algorithm for Linearly Constrained Adaptive Array Processing" by O. L. Frost III, Proc. of the IEEE, vol. 60, no. 8, pp. 926–935, August 1972.) The error signal is $$e(n) = \frac{\hat{u}^T(n) x(n)}{\|\hat{u}(n)\|}, \qquad (15)$$

and the constrained LMS algorithm may be expressed as $$\hat{u}(n+1) = \hat{u}(n) - \mu e(n) \nabla e(n), \qquad (16)$$

where $\mu$, the adaptation step, is a positive small constant and $$\nabla e(n) = \frac{1}{\|\hat{u}(n)\|} \left[ x(n) - e(n) \frac{\hat{u}(n)}{\|\hat{u}(n)\|} \right]. \qquad (17)$$

Substituting Equations (15) and (17) into Equation (16), and taking expectation after convergence gives $$R \frac{\hat{u}(\infty)}{\|\hat{u}(\infty)\|} = E\{e^2(n)\} \frac{\hat{u}(\infty)}{\|\hat{u}(\infty)\|}, \qquad (18)$$

which is the desired result: û converges in the mean to the eigenvector of R corresponding to the smallest eigenvalue $E\{e^2(n)\}$. To avoid roundoff error propagation, normalization is advantageously imposed on the vector û(n+1) after each update step. Finally the update equation is given by $$\hat{u}(n+1) = \frac{\hat{u}(n) - \mu e(n)\nabla e(n)}{\|\hat{u}(n) - \mu e(n)\nabla e(n)\|}. \quad (19)$$

Note that if this normalization is used, then $\|\hat{u}(n)\|$ (which appears in e(n) and $\nabla e(n)$) can be removed, since we will always have $\|\hat{u}(n)\|=1$. If the smallest eigenvalue is equal to zero, which is the case here, the algorithm can be simplified as follows:

$$e(n) = \hat{u}^T(n) \times (n), \quad (20)$$

$$\hat{u}(n+1) = \frac{\hat{u}(n) - \mu e(n) \times (n)}{\|\hat{u}(n) - \mu e(n) \times (n)\|}. \quad (21)$$

Since the goal here is not to accurately estimate the two impulse responses $g_1$ and $g_2$ but rather the time delay, only the two direct paths are of interest. In order to take into account negative and positive relative delays, we initialize $\hat{u}_{Mi2}(0)=1$ which will be considered as an estimate of the direct path of $g_2$ and during adaptation keep it dominant in comparison which the other M-1 taps of the first half of $\hat{u}(n)$ (containing an estimate of the impulse response $g_2$). A "mirror" effect will appear in the second half of $\hat{u}(n)$ (containing an estimate of the impulse response $-g_1$): a negative peak will dominate which is an estimate of the direct path of $-g_1$. Thus the relative sample delay will be simply the difference between the indices corresponding to these two peaks. To take advantage of the Fast Fourier Transform (FFT), the filter coefficients may be advantageously updated in the frequency domain using the unconstrained frequency-domain LMS algorithm, familiar to those of ordinary skill in the art. (See, e.g., "Unconstrained Frequency-Domain Adaptive Filter" by D. Mansour et al., IEEE Trans. Acoust., Speech, Signal Processing, vol. ASSP-30, pp. 726–734, October 1982: and "On Using the LMS Algorithm for Time Delay Estimation" by D. H. Youn et al., IEEE Trans. Acoust., Speech, Signal Processing, vol. ASSP-30, pp. 798–801, October 1982.)

Figure 2:
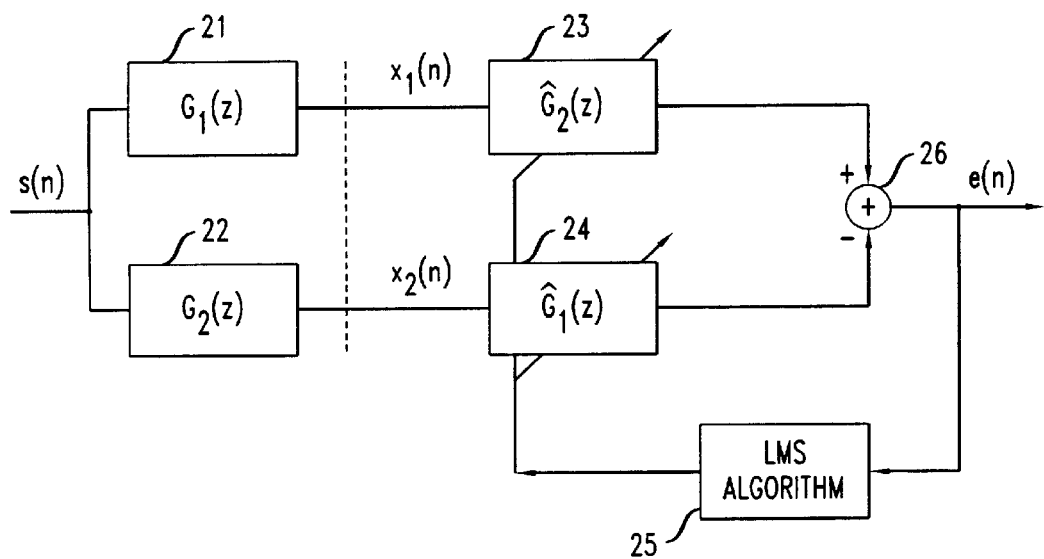
FIG. 2 shows an adaptive filter arrangement for use in the adaptive eigenvalue decomposition algorithm employed in accordance with an illustrative embodiment of the present invention.

FIG. 2 shows an adaptive filter arrangement for use in the adaptive eigenvalue decomposition algorithm employed in accordance with an illustrative embodiment of the present invention. Specifically, impulse response estimates $\hat{G}_1(z)$ and $\hat{G}_2(z)$ for adaptive filters 24 and 23, respectively, are calculated with use of conventional LMS algorithm 25, so that the error signal e(n), computed by subtractor 26, is minimized. In particular, adaptive filter 24 attempts to estimate impulse response 21—namely, $G_1(z)$—while adaptive filter 23 attempts to estimate impulse response 22—namely, $G_2(z)$. Then, in accordance with the principles of the present invention and in accordance with an illustrative embodiment thereof, the filter coefficients of these resultant impulse response estimates—i.e., filter functions $\hat{G}_1(z)$ and $\hat{G}_2(z)$—may be advantageously used to determine the TDE, as described above.

An Illustrative Source Localization Procedure Overview

In a passive acoustic source localization system in accordance with various illustrative embodiments of the present invention, the second step of the process employs the set of TDOA estimates (determined in the first step of the process) to perform the localization of the acoustic source. Since the equations describing source localization issues are highly nonlinear, the estimation and quantization errors introduced into the TDE step will be magnified more with some methods than others.

As pointed out above, many processing techniques have been proposed for acoustic source localization, any of which may be employed in accordance with various illustrative embodiments of the present invention. For example, one approach derives an expression for the likelihood function, and gives the maximum likelihood (ML) source location estimate as its maximizer. (See "Optimum Localization of Multiple Sources by Passive Arrays" by M. Wax et al., IEEE Trans. Acoust., Speech, Signal Processing, vol. ASSP-31, pp. 1210–1218, October 1983.) Since the joint probability density function (pdf) of the errors in the time differences has to be assumed a priori, a ML estimator can not generate optimum solutions in most practical applications, however. Furthermore, a ML estimator needs to search its maximizer iteratively by using initialized gradient descent based methods. Selecting a good initial guess to avoid local minima is difficult and convergence to the optimal solution of the iterative process can not be guaranteed. Thus, closed-form source localization estimators have gained wider attention due mainly to their computational simplicity and, to some extent, acceptable robustness to noise.

One such approach is to triangulate the source location from time estimates. (See, e.g., "Voice Source Localization for Automatic Camera Pointing System in Videoconferencing" by H. Wang et al., Proc. IEEE ASSP Workshop Appls. Signal Processing Audio Acoustics, 1997.) In such a triangulation procedure, familiar to those of ordinary skill in the art, the number of TDOA estimates are equal to the number of unknowns (depth, direction, and azimuth). Therefore, such a technique is unable to take advantage of extra sensors and TDOA redundancy, and it is also very sensitive to noise in the TDOA estimates, especially when the source is far from the sensors and the values of TDOAs are small. Another approach, also familiar to those of ordinary skill in the art, is to realize that the sensitivity problems with triangulation algorithm are basically due to solving the hyperbolic equations. In order to avoid intersecting hyperboloids, the problem may be recast into one that employs spheres. This is known to those of ordinary skill in the art as the spherical intersection (SX) algorithm. (See, e.g., "Passive Source Localization Employing Intersecting Spherical Surfaces from Time-of-Arrival Differences" by H. C. Schau et al., IEEE Trans. Acoust., Speech, Signal Processing, vol. ASSP-35, pp. 1223–1225, August 1987.) Note, however, that the SX algorithm requires the solution of a quadratic equation to determine the depth of the acoustic source. The solution may not exist or may not be unique. Finally, a spherical interpolation (SI) method, also known to those of ordinary skill in the art, has been proposed. (See, "Closed-Form Least-Squares Source Location Estimation from Range-Difference Measurements" by O. Smith et al., IEEE Trans. Acoust., Speech, Signal Processing, vol. ASSP-35, pp. 1661–1669, December 1987.) The SI method solves the spherical equations in a least-squares sense. In practice, the SI method has been reported capable of achieving greater noise immunity than the SX method.

Figure 3:
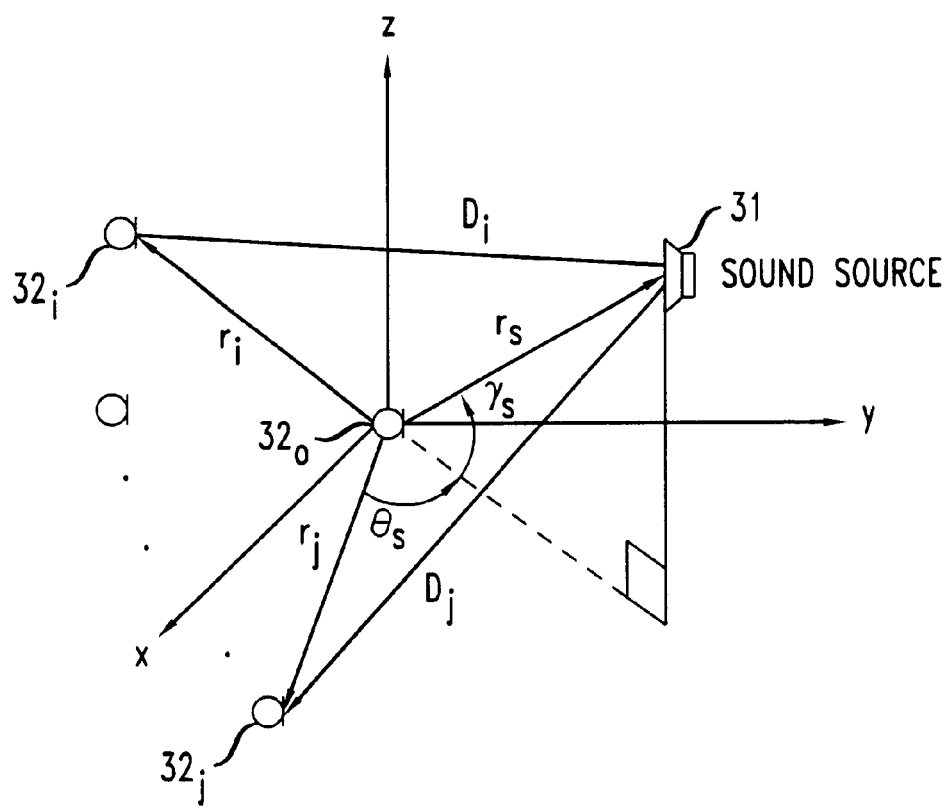
FIG. 3 shows a schematic diagram of three-dimensional space illustrating certain defined notation for use in the source localization problem solved in accordance with an illustrative embodiment of the present invention.

Specifically, therefore, the problem addressed herein is the determination of the location of an acoustic source given the array geometry and relative TDOA measurements among different microphone pairs. The problem can be stated mathematically with reference to FIG. 3 as follows:

A microphone array of N+1 microphones (microphones $32_0$ through $32_N$) is located at $$r_i \triangleq (x_i, y_i, z_i)^T, \; i=0, \ldots, N \quad (22)$$

in a Cartesian coordinate (see FIG. 3). The first microphone, microphone $32_0$ (i=0) is regarded as the reference and is mounted at the origin of the coordinate, i.e., $r_0=(0, 0, 0)$. The acoustic source, sound source 31, is located at $$r \triangleq (x_s, y_s, z_s)^T. \quad (23)$$

The distances from the origin to the i-th microphone and the source are denoted by $R_i$ and $R_s$ respectively.

$$R_i \triangleq \|r_i\|_2 = \sqrt{x_i^2 + y_i^2 + z_i^2}, \quad i = 1, \cdots, N \tag{24}$$

$$R_s \triangleq \|r_s\|_2 = \sqrt{x_s^2 + y_s^2 + z_s^2}. \tag{25}$$

The distance between the source (sound source 31) and the i-th microphone (microphone $32_i$) is denoted by $$D_i \triangleq \|r_i - r_s\|_2 = \sqrt{(x_i - x_s)^2 + (y_i - y_s)^2 + (z_i - z_s)^2}. \tag{26}$$

Then, the distance difference between microphone $32_i$ and $32_j$ from the source is given by $$d_{ij} \triangleq D_i - D_j, \quad i,j=0, \ldots, N. \tag{27}$$

The difference is usually referred to as the "range difference" and it is proportional to the time delay of arrival $\tau_{ij}$ with the speed of sound, c, namely, $$d_{ij} = c \tau_{ij}, \tag{28}$$

where, the speed of sound (in meters per second) can be estimated from the air temperature $t_{air}$ (in degrees Celsius) according to the approximate (first-older) formula, $$c \approx 331 + 0.610 \times t_{air}. \tag{29}$$

(The notations defined above are illustrated in FIG. 3.)

The localization problem is then to estimate $r_s$ given a set of $r_i$ and $\tau_{ij}$. Note that there are $$\frac{(N+1)N}{2}$$

distinct TDOA estimates $\tau_{ij}$ which excludes the case i=j and counts $\tau_{ij} = -\tau_{ji}$ pair only once. However, in the noiseless case, the space spanned by such TDOA estimates is a space of N dimensions. Any N linearly independent TDOAs determine all the rest. In a noisy environment, the TDOA redundancy can be taken into account to improve the accuracy of the localization algorithms. For simplicity and also without loss of generality, therefore, we choose $\tau_{i0}$, i=1, ... N as the base of such $R^N$ space herein.

Source Localization Using an Ideal Maximum Likelihood Locator

Given a set of TDOA estimates $\tau=(\tau_{10}, \tau_{20}, \ldots \tau_{N0})^T$, the likelihood function of a source location is the joint probability of these TDOA estimates conditioned on the source location, i.e., $$L(r_s) = Pr(\tau|r_s) = Pr(\tau_{10}, \tau_{20}, \ldots, \tau_{N0}|r_s). \tag{30}$$

The maximum likelihood solution is then given by $$\hat{r}_{sML} = \arg\max_{r_s} Pr(\tau|r_s) = \arg\max_{r_s} Pr(\tau_{10}, \tau_{20}, \ldots, \tau_{N0}|r_s). \tag{31}$$

By assuming that the additive noise in TDOAs is zero mean and jointly Gaussian distributed, the joint probability density function of $\tau$ on $r_s$ is given by $$\int (\tau|r_s) = N(\tau; \tau_m(r_s)\Sigma) \tag{32}$$

$$= \frac{1}{\sqrt{(2\pi)^N \det(\Sigma)}} \exp\left\{-\frac{1}{2}(\tau - \tau_m(r_s))^T \Sigma^{-1}(\tau - \tau_m(r_s))\right\}$$

where, $\tau_m(r_s)$ and $\Sigma$ are respectively the mean vector and the covariance matrix of the estimated TDOAs and "det" denotes the determinant of its argument. In these parameters, only the mean vector $\tau_m(r_s)$ is a function of the source location $r_s$. The covariance matrix depends only on the noise signal.

Since $\Sigma$ is positive definite, the maximum likelihood solution is equivalent to that minimizing the error function defined as, $$\epsilon(r_s) \triangleq (\tau - \tau_m(r_s))^T \Sigma^{-1}(\tau - \tau_m(r_s)) \tag{33}$$

Direct estimation of the minimizer is not practicable. If the noise is assumed uncorrelated, the covariance matrix is diagonal $$\Sigma = \text{diag}(\sigma_1^2, \sigma_2^2, \ldots, \sigma_N^2) \tag{34}$$

and the error function as defined in Equation (33) can be rewritten as $$\varepsilon(r_s) = \sum_{i=1}^{N} \frac{[\tau_{10} - \tau_{10,10}(r_s)]^2}{\sigma} \tag{35}$$

The steepest descent algorithm can be used to find $\hat{r}_{s,ML}$ iteratively by $$\hat{r}_s(n+1) = \hat{r}_s(n) - \frac{1}{2}\mu \nabla \epsilon(\hat{r}_s(n)), \tag{36}$$

where $\mu$ is the step size.

Source Localization Using Triangulation Locator

In the closed-form source locators, triangulation is the most straightforward method. Consider the given set of TDOA estimates $\tau = (\tau_{10}, \tau_{20}, \ldots \tau_{N0})^T$, and convert them into a range difference vector $d = (d_{10}, d_{20}, \ldots, d_{N0})^T$ by using Equation (28) above. Each range difference $d_{i0}$ in turn defines a hyperboloid by $$D_i - D_0 = \|r_i - r_s\|_2 - \|r_0 - r_s\|_2 = d_{i0}. \tag{37}$$

All points on such hyperboloid have the same range difference $d_{i0}$ to the two microphones. Since the acoustic source location is intended to be determined in $R^3$ space, there are three unknowns and N=3 (i.e., 4 microphones) will make the problem possible to solve. Then the acoustic sources lies on three hyperboloids and satisfies the rest of hyperbolic equations:

$$\begin{cases} \|r_1 - r_s\|_2 - \|r_0 - r_s\|_2 = d_{10} \\ \|r_2 - r_s\|_2 - \|r_0 - r_s\|_2 = d_{20} \\ \|r_3 - r_s\|_2 - \|r_0 - r_s\|_2 = d_{30} \end{cases} \tag{38}$$

This equation set is highly nonlinear. If microphones are arbitrarily arranged a closed-form solution may not exist and numerical methods must be used. In our simulations and for this method, the microphones are placed at $$r_1 = (R,0,0)^T, \ r_2 = (R\cos\theta_2, R\sin\theta_2, 0)^T, \ r_3 = (0, 0, R)^T, \tag{39}$$

and the problem is solved in polar coordinates.

From a geometric point of view, the triangulation locator finds the source location by intersecting three hyperboloids. This approach is easy to implement. However, determinant characteristics of triangulation algorithm makes it very sensitive to noise in TDOAs. Small errors in TDOA can deviate the estimated source far from the true location.

Source Localization Using a Spherical Intersection (SX) Locator

In order to avoid solving the set of hyperbolic Equations (38) whose solution is very sensitive to noise, the source localization problem call be reorganized into a set of spherical equations. The spherical intersection locator seeks to find the source location by intersecting a group of spheres centered at the microphones.

Consider the distance from the i-th microphone to the acoustic source. From the definition of the range difference of Equation (27) and from the fact that $D_0 = R_s$, we have $$D_i = R_s + d_{i0}. \tag{40}$$

From the Pythagorean theorem, $D_i^2$ call also be written as, $$D_i^2 \|r_i - r_s\|_2^2 = R_i^2 - 2r_i^T r_s + R_s^2. \tag{42}$$

Substituting Equation (40) into Equation (41) yields, $$(R_s + d_{i0})^2 = R_i^2 - 2r_i^T r_s + R_s^2, \tag{42}$$

or, $$r_i^T r_s + d_{i0} R_s = \tfrac{1}{2}(R_i^2 - d_{i0}^2), \; i=1, \ldots, N. \tag{43}$$

Putting the N equations together and writing them into a matrix form, $$A\theta = b,$$

where $$A \triangleq [S \mid d], \text{ and } S \triangleq \begin{bmatrix} x_1 & y_1 & z_1 \\ x_2 & y_2 & z_2 \\ \vdots \\ x_N & y_N & z_N \end{bmatrix}, \theta \triangleq \begin{bmatrix} x_s \\ y_s \\ z_s \\ R_s \end{bmatrix}, b \triangleq \frac{1}{2}\begin{bmatrix} R_1^2 - d_{10}^2 \\ R_2^2 - d_{20}^2 \\ \vdots \\ R_N^2 - d_{N0}^2 \end{bmatrix}. \tag{44}$$

the spherical equations are linear in $r_s$ given $R_s$ and vice versa.

The SX locator solves the problem in two steps. It first finds the least-squares solution for $r_s$ in terms of $R_s$.

$$r_s = (S^T S)^{-1} S^T (b - R_s d). \tag{45}$$

Then, substituting (40) into $R_s^2 = r_s^T r_s$ yields the quadratic equation, $$R_s^2 = [(S^T S)^{-1} S^T (b - R_s d)]^T [(S^T S)^{-1} S^T (b - R_s d)] \tag{46}$$

After expansion, $$aR_s^2 + bR_s + c = 0, \tag{47}$$

where, a=1−$d^T$S'd,
b=2$b^T$S'd,
c=−$b^T$S'b, and
S'=$[(S^T S)^{-1} S^T]^T [(S^T S)^{-1} S^T]$.

The valid (real, positive) root is taken as an estimate of the source depth $R_s$ and is then substituted into Equation (45) to calculate the SX estimate of the source location $r_{s,SX}$.

In the SX procedure, the solution of the quadratic Equations (47) for the source depth $R_s$ is required. This solution must be a positive value by all means. If no real positive root is available, the SX solution does not exist. On the contrary, if both of the roots are real and greater than 0, then the SX solution is not unique. In both cases, the SX locator fails to provide reliable estimate for source location. This is not desirable for real-time operation.

Source Localization Using a Spherical Interpolation (SI) Locator

In order to overcome the drawback of spherical intersection, a spherical interpolation locator has been proposed which attempts to relax the restriction $R_s = \|r_s\|_2$ by estimating $R_s$ in the least-squares sense.

To begin, substitute the least-squares solution of Equation (45) into the original spherical Equations (44) to obtain, $$[I_N - S(S^T S)^{-1} S^T] dR_s = [I_N - S(S^T S)^{-1} S^T] b, \tag{48}$$

where $I_N$ is an N×N identity matrix. The least-squares solution is then given by, $$R_{s,SI} = \frac{d^T P_s b}{d^T P_s d}, \tag{49}$$

where, $$P_s \triangleq I_N - S(S^T S)^{-1} S^T = P_s^T P_s. \tag{50}$$

Substituting this solution into Equation (45) yields the spherical interpolation estimate, $$r_{s,SI} = (S^T S)^{-1} S^T = \left[I_N - \left(\frac{d d^T P_s}{d^T P_s d}\right)\right] b. \tag{51}$$

In simulations, the SI locator performs better, but is computationally more complex than SX locator.

Source Localization Using a One Step Least Squares (OSLS) Locator

The SI method tries to solve the spherical Equations (44) for the source depth and its location in two separate steps. Since both are calculated in the least-squares sense, however, it has been realized that the procedure can be simplified by a one-step least-squares method as described herein. In particular, the one-step least-squares method advantageously generates the same results as the SI method but with less computational complexity, which is highly desirable for real-time implementations.

In particular, the least-squares solution of Equation (44) for θ (the source location as well as its depth) is given by:

$$\hat{\theta}_{OSLS} = (A^T A)^{-1} A^T b, \tag{52}$$

or written into block form as $$\hat{\theta}_{OSLS} \begin{bmatrix} S^T S_{3\times 3} & S^T d_{3\times 1} \\ d^T S_{1\times 3} & d^T d_{1\times 1} \end{bmatrix}^{-1} \begin{bmatrix} S^T_{3\times N} \\ d^T_{1\times N} \end{bmatrix} b. \tag{53}$$

First, write the matrix that appears in Equation (53) as follows:

$$\begin{bmatrix} S^T S_{3\times 3} \mid S^T d_{3\times 1} \\ d^T S_{1\times 3} \mid d^T d_{1\times 1} \end{bmatrix}^{-1} = \begin{bmatrix} Q_{3\times 3} \mid v_{3\times 1} \\ v^t_{1\times 3} \mid k_{1\times 1} \end{bmatrix}, \quad (54)$$

where, $$v = -\left(S^T S - \frac{S^T d d^T S}{d^T d}\right)^{-1} \frac{S^T d}{d^T d}, \quad (55)$$

$$Q = (S^T S)^{-1}[I_3 - (S^T d)v^T], \quad (56)$$

$$k = \frac{1 - (d^T S)v}{d^T d}. \quad (57)$$

Define $$P_d \triangleq I_N - \frac{dd^T}{d^T d}, \quad (58)$$

and find, $$v = -(S^T P_d S)^{-1} \frac{S^T d}{d^T d}, \quad (59)$$

$$Q = (S^T P_d S)^{-1}. \quad (60)$$

Substituting, Equation (54) with Equation (59) and Equation (60) into Equation (53) yields $$\hat{r}_{s,OSLS} = [QS^T + vd^T]b \quad (61)$$

$$= \left[(S^T P_d S)^{-1} S^T - (S^T P_d S)^{-1} \frac{S^T d}{d^T d} d^T\right] b$$

$$= (S^T P_d S)^{-1} S^T P_d b.$$

It can be determined that the solution of Equation (61) is equivalent to the SI estimates of Equation (51), i.e., $$\hat{r}_{s,OSLS} = \hat{r}_{s,SI}. \quad (62)$$

However, consider the computational complexity for the SI and OSLS methods. To calculate the inverse of an M×M matrix by using the Gauss-Jordan method without pivoting (familiar to one of ordinary skill in the art), the numbers of necessary scalar multiplications and additions are given by $$Mul_{mI} = M^3 + \frac{M^2}{2} - \frac{M}{2} + \sum_{i=1}^{M-1} i^2, \quad (63)$$

$$Add_{mI} = M^3 - M^2 + \sum_{i=1}^{M-1} i^2. \quad (64)$$

To multiply matrix $X_{p \times k}$ with matrix $Y_{k \times q}$, the numbers of scalar multiplications and additions in general are $$Mul_{mm} = pqk, \quad Add_{mm} = pq(k-1). \quad (65)$$

For the SI locator of Equation (51), many matrix multiplications and one 3×3 matrix inverse need to be performed.

Note that $P_s$ is symmetric (i.e., $P_s = P_s^T$), and idempotent (i.e., $P_s = P_s^T$). Then, estimating the source location needs $$Mul_{SI} = N^3 + 6N^2 + 22N + 35 \sim O(N^3), \quad (66)$$

$$Add_{SI} = N^3 + 4N^2 + 15N + 11 \sim O(N^3), \quad (67)$$

multiplications and additions, respectively. Both are on the order of $O(N^3)$. While for the OSLS locator, only three matrix multiplications and one 4×4 matrix inverse are required. The numbers of scalar multiplications and additions are found as $$Mul_{OSLS} = 36N + 84 \sim O(N), \quad (68)$$

$$Add_{OSLS} = 32N + 42 \sim O(N), \quad (69)$$

which are on the order of only $O(N)$. When $N \geq 4$ (i.e., 5 microphones), the OSLS method is more computationally efficient that the SI method.

An Illustrative Implementation of a Novel Video Camera Steering System

Figure 4:
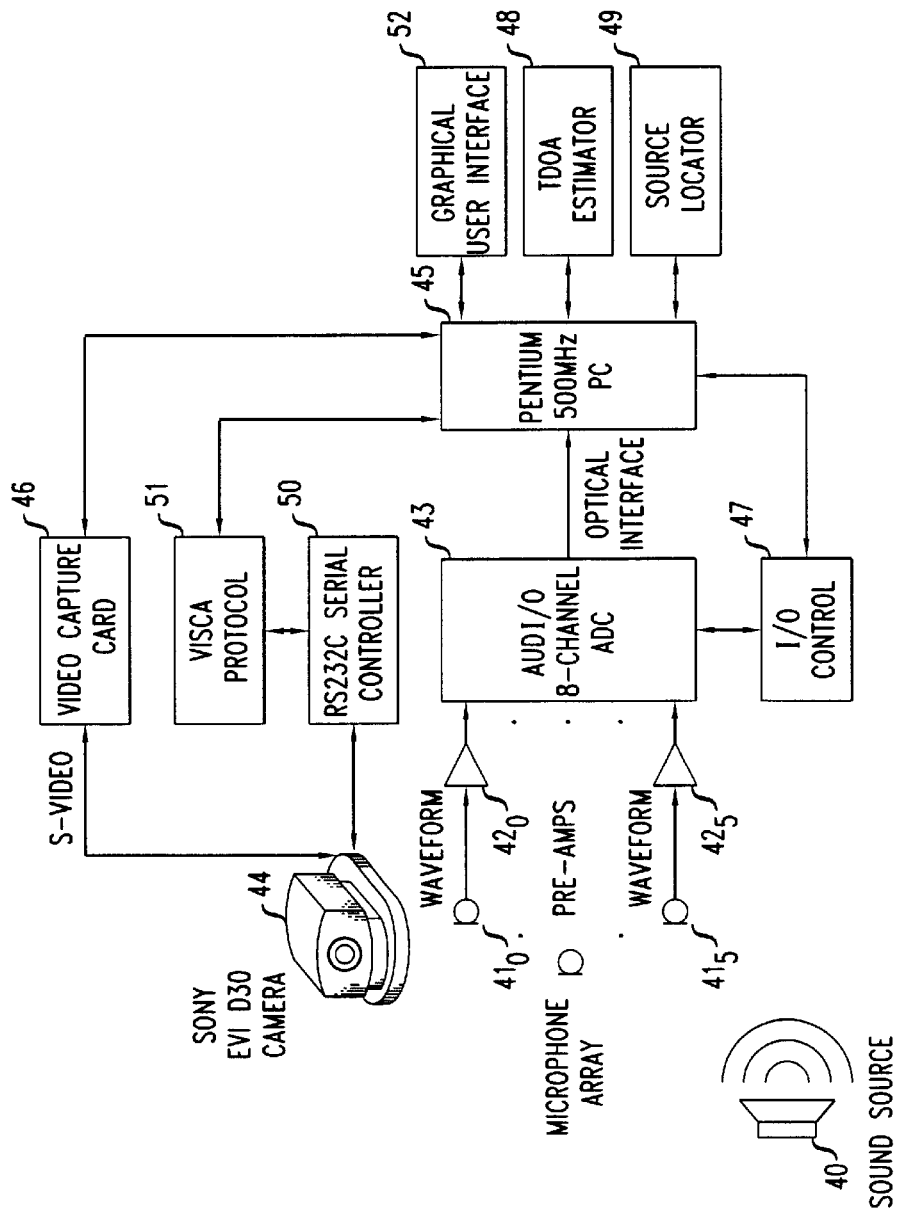
FIG. 4 shows a schematic block diagram of a real-time system infrastructure which may be employed in accordance with an illustrative embodiment of the present invention.

A real-time passive acoustic source localization system for video camera steering in accordance with an illustrative embodiment of the present invention has been implemented and consists of several hardware components and software modules. The performance of the illustrative source localization algorithm depends in particular on the geometry and size of the microphone array, an illustrative design for which is described below. Specifically, FIG. 4 shows a schematic block diagram of a real-time system infrastructure which may be employed in accordance with an illustrative embodiment of the present invention. The illustrative system comprises a real-time PC-based passive acoustic source localization system for video camera steering, comprising a front-end 6-element microphone array consisting of microphone $41_0$ through microphone $41_5$ with Pre-amplifiers $42_0$ through $42_5$, Sonorus AUDI/O™ AD/24 8-channel A/D converter 43, video camera 44, and PC 45 equipped with Video Capture Card 46 and a Sonorus STUDI/O™ 16-channel digital audio interface board.

A Pentium III™ 500 MHz PC (Dell Dimension XPS T500™) is used as a host computer (PC 45) for performing user interaction, data I/O control, time delay estimation, source localization, camera steering, and video display. A user-friendly graphical interface, Graphical User Interface 52, may be advantageously designed to facilitate the user-application interaction. The software for the illustrative system is running under Microsoft Windows98™. It consists of five major modules: acoustic signal I/O Control 47, time delay estimation using TDOA Estimator 48, source localization using source Locator 49, Graphical User Interface 52, and video camera communications protocols for video camera steering using an RS232C serial protocol and a Video System Control Architecture (VISCA™) protocol.

The analog acoustic signal is sampled at 44.1 kHz, downsampled to 8.82 kHz, and quantized with 16 bits per sample. In accordance with the principles of the present invention, five TDOAs are advantageously estimated by the AEDA algorithm of TDOA Estimator 48, using a fixed step size which is $\mu$=0.01 and where the length of the adaptation vector u(n) is L=2M=1024. These TDOAs are supplied to the OSLS source location algorithm of Source Locator 49. Benefiting from the efficient time delay estimator and source locator, the overall system has a relatively small computational resource requirement which can be met easily by the general-purpose Pentium III™ processor without any additional specific digital signal processor. The source location estimate is advantageously updated at 8 times/sec and is used to drive the video camera. PC 45 communicates with the camera through two layers of protocol, namely RS232C Serial Controller 50 and Video System Control Architecture (VISCA™) Protocol 51. Finally, the video output is fed into the PC through Video Capture Card 46 and displayed on a video screen.

In this illustrative system, the microphones may, for example, comprise a set of six Lucent Speech Tracker Directional™ hypercardioid microphones of 6 dB directivity index. These microphones advantageously reject noise and reverberation from the real and allow better speech signal recording than omnidirectional microphones in the half plane in front of the microphone array. The frequency response of a Lucent Speech Tracker Directional™ microphone is 200–6000 Hz. Beyond 4 kHz there is negligible energy and the recorded signal can be recorded as bandlimited by 4 kHz.

A set of six one-stage pre-amplifiers having, for example, fixed gain 37 dB, may be advantageously used to enhance the signal output of each microphone. The pre-amplifier outputs are connected to the analog inputs from the rear panel using twisted pair balanced cables provided with XLR connectors. The digital outputs are supplied to the STUDI/O™ digital auto interface card which is installed on the PC running Windows98™, using an optic fiber provided with a TOSLINK connector. The STUDI/O™ board may be set as an eight-channel logical device to the Windows Sound System for easy synchronization.

The illustrative passive acoustic source localization system advantageously uses a high-quality (a resolution 460 H×350 V lines) Sony EVI-D30™ color video camera with pan, tilt and zoom control. The ±100° pan range, ±25° tilt range, and 4.4°~48.8° horizontal angle of view, allows for optimum coverage of a normal conference room environment. The EVI-D30™ camera has two high speed motors for panning and tilting. The maximum pan speed is approximately 80°/sec and the maximum tilt speed is 50°/sec. Pan, tilt, and zoom operation can be performed at the same time. Therefore, the camera is able to capture the full interaction of videoconference participants at remote locations.

The EVI-D30™ camera can be controlled by PC 45 with two layers of communication protocol—RS232C Serial Controller 50 and Video System Control Architecture (VISCA™) Protocol 51. The RS232C controller sends and receives 8 bits data at 9600 bits per second, with 1 start bit, 1 stop bit and non parity. VISCA™ is a camera control protocol designed to interface a wide variety of video equipment to computer. The video output is fed into the PC through Video Capture Card 46 and displayed on the video screen. The camera may be advantageously integrated with the microphone array for portability.

The microphone array geometry and size play an important role in the system performance. In general, the bias and standard deviation decrease as the array size gets bigger. However, the array size is usually restricted by the application requirement. For the illustrative system of FIG. 4, for example, in order to provide portability, the distance of each microphone $41_i$ (i=1 to 5) to the reference one at the origin (microphone $41_0$) is advantageously limited to $R_i$=40 cm, i=1, . . . , V. But otherwise, the microphone array topology permits a great deal of freedom for performance optimization.

Figure 5:
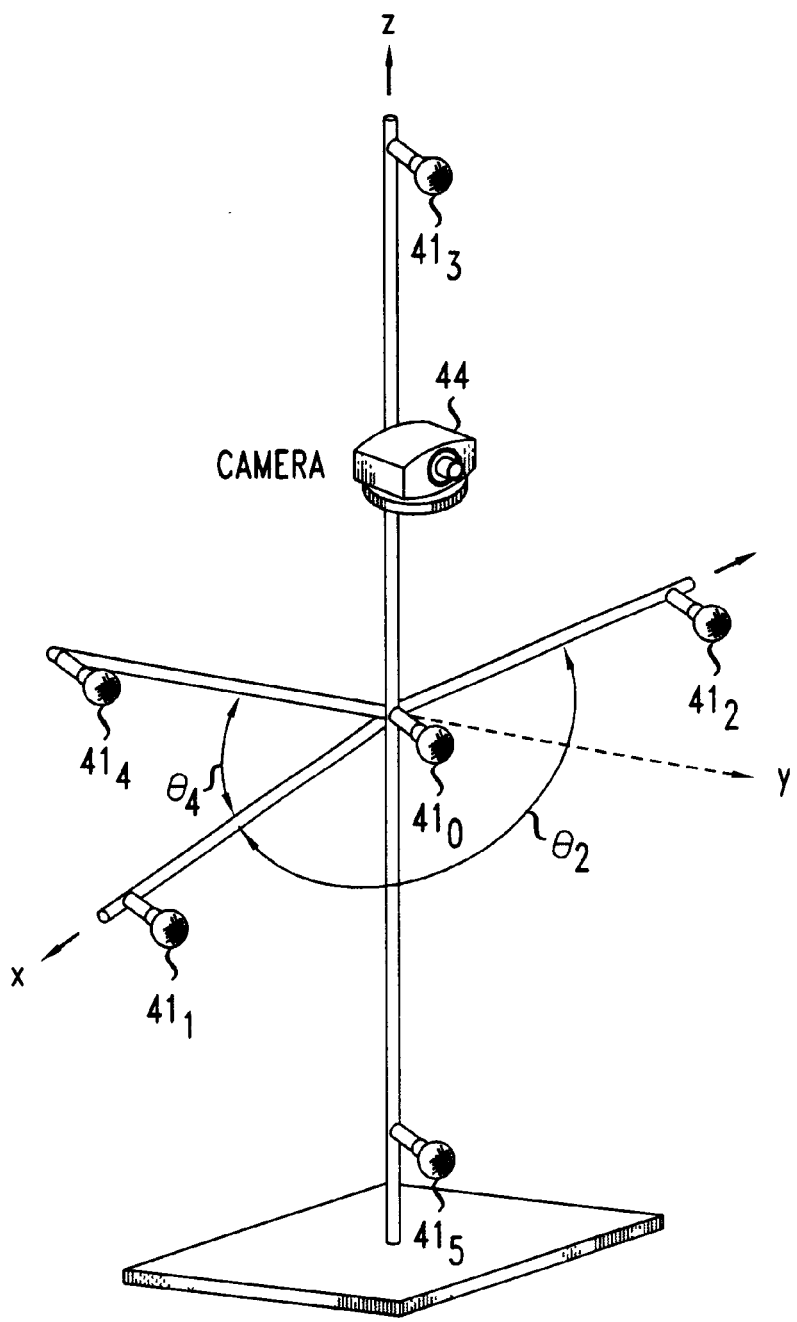
FIG. 5 shows an illustrative three-dimensional microphone array for passive acoustic source location in accordance with an illustrative embodiment of the present invention.

Specifically then, in accordance with the illustrative embodiment of the present invention illustrated in FIG. 4 and described herein, six microphones are employed. In particular, FIG. 5 shows an illustrative three-dimensional microphone array for passive acoustic source location in accordance with an illustrative embodiment of the present invention. In FIG. 5, microphone $41_0$ is mapped to the origin and microphone $41_1$ is placed on the x axis. For symmetric performance to the horizontal plane, microphones $41_3$ and $41_5$ are placed on the z and -z axes, respectively. Then, only two degrees of freedom, $\theta_2$, and $\theta_4$, which represent the positions of microphone $41_2$ and $41_4$, respectively within the x-y (i.e., the horizontal) plane, can be manipulated. Monte-Carlo simulations using the illustrative OSLS locator were performed to determine advantageous values for $\theta_2$ and $\theta_4$. The root-mean-square (rms) error defined by $$\sigma \stackrel{\Delta}{=} \sqrt{bias^2 + variance}, \tag{70}$$

was used as the figure of merit. For each source location, white Gaussian noise with mean zero and variance 0.25 was added to the TDOAs and the rms error was obtained from 100-trial Monte-Carlo runs. As a result of these simulations, values of $\theta_2$=150° and $\theta_4$=90° were determined to be highly advantageous. Moreover, such values advantageously provide for easy microphone location and setup.

Therefore, in the illustrative system of FIGS. 4 and 5, the microphone array, has been designed according to the above-described simulation results. Specifically, the reference microphone $41_0$ is located at the origin of the coordinate. Microphones $41_1$, $41_2$, and $41_4$ are placed with equal distance of 50 centimeters from the origin on the x-y (i.e., the horizontal) plane. For symmetric performance to the horizontal plane, the additional two microphones, microphones $41_3$ and $41_5$, are installed on z and -z axis, respectively, each 40 centimeters from the origin. In order to achieve portability, the microphone array is advantageously integrated with the Sony EVI-D30™ video camera by using a frame.

Addendum to the Detailed Description

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the Figs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the functions. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

What is claimed is:

1. A method of locating an acoustic source within a physical environment with use of a plurality of microphones placed at different locations within said physical environment, each microphone receiving an acoustic signal resulting from said acoustic source and generating a corresponding microphone output signal in response thereto, the method comprising the steps of:
   estimating a first impulse response representative of the acoustic signal received by a first one of said microphones and estimating a second impulse response representative of the acoustic signal received by a second one of said microphones;
   determining a relative time delay of arrival between said acoustic signal received by said first one of said microphones and said acoustic signal received by said second one of said microphones, said determination based on said estimated first impulse response and on said estimated second impulse response; and
   locating said acoustic source within said physical environment based on said determined relative time delay of arrival,
   wherein the step of estimating the first and second impulse responses includes filtering said microphone output signal of said first one of said microphones with a first adaptive filter and filtering said microphone output signal of said second one of said microphones with a second adaptive filter; and,
   said step of estimating the first and second impulse responses further includes adjusting said first adaptive filter to provide an estimate of said second impulse response and adjusting said second adaptive filter to provide an estimate of said first impulse response.

2. The method of claim 1 wherein the step of determining the relative time delay of arrival comprises measuring the distance between a first peak of said estimated first impulse response and a first peak of said estimated second impulse response.

3. The method of claim 1 wherein the step of determining the relative time delay of arrival comprises determining a first significant tap of said adjusted first adaptive filter and determining a first significant tap of said adjusted second adaptive filter and performing a comparison therebetween.

4. The method of claim 1 wherein the first and second adaptive filters are inherently adjusted so as to minimize the value of an error function comprising the difference of the flittered microphone output signal of said first one of said microphones and the flittered microphone output signal of said second one of said microphones.

5. The method of claim 4 wherein said first and second adaptive filters are adjusted with use of an LMS algorithm.

6. The method of claim 5 wherein the LMS algorithm comprises an unconstrained LMS algorithm performed in the frequency domain.

7. The method of claim 1 wherein said physical environment comprises an N dimensional space and wherein said plurality of microphones comprises at least N+1 microphones.

8. The method of claim 7 wherein the step of locating said acoustic source is based on at least N determined relative time delays of arrival, each relative time delay of arrival being between said acoustic signal received by said first one of said microphones and said acoustic signal received by another different one of said at least N+1 microphones.

9. The method of claim 8 wherein the step of locating said acoustic source comprises a maximum likelihood algorithm.

10. The method of claim 8 wherein tie step of locating said acoustic source comprises a triangulation algorithm.

11. The method of claim 8 wherein the step of locating said acoustic source comprises a spherical intersection algorithm.

12. The method of claim 8 wherein the step of locating said acoustic source comprises a spherical interpolation algorithm.

13. The method of claim 8 wherein the step of locating said acoustic source comprises a one-step least-squares algorithm.

14. An apparatus for locating an acoustic source within a physical environment comprising:
   a plurality of microphones placed at different locations within said physical environment, each microphone receiving an acoustic signal resulting from said acoustic source and generating a corresponding microphone output signal in response thereto;
   a first adaptive filter applied to said microphone output signal of a first one of said microphones, and a second adaptive filter applied to said microphone output signal of a second one of said microphones, the second adaptive filter estimating a first impulse response representative of the acoustic signal received by said first one of said microphones, and the first adaptive filter estimating a second impulse response representative of the acoustic signal received by said second one of said microphones;
   means for determining a relative time delay of arrival between said acoustic signal received by said first one of said microphones and said acoustic signal received by said second one of said microphones, said determination based on said estimated first impulse response and on said estimated second impulse response; and
   means for locating said acoustic source within said physical environment based on said determined relative time delay of arrival.

15. The apparatus of claim 14 wherein the means for determining the relative time delay of arrival comprises means for measuring the distance between a first peak of said estimated first impulse response and a first peak of said estimated second impulse response.

16. The apparatus of claim 14 further comprising means for adjusting said second adaptive filter to estimate the first impulse response and for adjusting said first adaptive filter to estimate the second impulse response.

17. The apparatus of claim 16 wherein the means for determining the relative time delay of arrival comprises means for determining a first significant tap of said adjusted first adaptive filter, means for determining a first significant tap of said adjusted second adaptive filter, and means for performing a comparison therebetween.

18. The apparatus of claim 16 further comprising means for computing an error function equal to the difference of the filtered microphone output signal of said first one of said microphones and the filtered microphone output signal of said second one of said microphones, and wherein said means for adjusting said first and second adaptive filters adjusts said first and second adaptive filters so as to minimize the value of the error function.

19. The apparatus of claim 18 wherein said means for adjusting said first and second adaptive filters comprises an LMS algorithm.

20. The apparatus of claim 19 wherein the LMS algorithm comprises an unconstrained LMS algorithm performed in the frequency domain.

21. The apparatus of claim 14 wherein said physical environment comprises an N dimensional space and wherein said plurality of microphones comprises at least N+1 microphones.

22. The apparatus of claim 21 wherein the means for locating said acoustic source is based on at least N determined relative time delays of arrival, each relative time delay of arrival being between said acoustic signal received by said first one of said microphones and said acoustic signal received by another different one of said at least N+1 microphones.

23. The apparatus of claim 22 wherein the means for locating said acoustic source comprises an implementation of a maximum likelihood algorithm.

24. The apparatus of claim 22 wherein the means for locating said acoustic source comprises an implementation of a triangulation algorithm.

25. The apparatus of claim 22 wherein the means for locating said acoustic source comprises an implementation of a spherical intersection algorithm.

26. The apparatus of claim 22 wherein the means for locating said acoustic source comprises an implementation of a spherical interpolation algorithm.

27. The apparatus of claim 22 wherein the means for locating said acoustic source comprises an implementation of a one-step least-squares algorithm.

* * * * *